(12) United States Patent
Debilzen et al.

(10) Patent No.: US 12,496,558 B2
(45) Date of Patent: Dec. 16, 2025

(54) PARTICULATE MATTER EVACUATION PUMP

(71) Applicant: Cummins Filtration Inc., Nashville, TN (US)

(72) Inventors: James A. Debilzen, Brooklyn, WI (US); Bryan P. Steffen, Oregon, WI (US); Matt Louison, McFarland, WI (US); Daniel Potratz, Stoughton, WI (US); Scott W. Schwartz, Cottage Grove, WI (US)

(73) Assignee: Cummins Filtration Inc., Nashville, TN (US)

( * ) Notice: Subject to any disclaimer, the term of this patent is extended or adjusted under 35 U.S.C. 154(b) by 586 days.

(21) Appl. No.: 17/802,444

(22) PCT Filed: Feb. 18, 2021

(86) PCT No.: PCT/US2021/018489
§ 371 (c)(1),
(2) Date: Aug. 25, 2022

(87) PCT Pub. No.: WO2021/173413
PCT Pub. Date: Sep. 2, 2021

(65) Prior Publication Data
US 2023/0116444 A1    Apr. 13, 2023

Related U.S. Application Data

(60) Provisional application No. 62/983,168, filed on Feb. 28, 2020.

(51) Int. Cl.
*B01F 23/20* (2022.01)
*B01D 46/48* (2006.01)

(52) U.S. Cl.
CPC .............. *B01F 23/20* (2022.01); *B01D 46/48* (2013.01)

(58) Field of Classification Search
CPC ........ B01D 46/00; B01D 50/00; B01D 46/48; B01F 23/20
See application file for complete search history.

(56) References Cited

U.S. PATENT DOCUMENTS 3,137,553 A    6/1964   Billey
4,090,666 A *  5/1978   Peck ...................... B05B 5/047
                                                      239/405

(Continued)

FOREIGN PATENT DOCUMENTS

DE    10 2018 110 660 A1    11/2019
EP       0 189 709 A1         8/1986

(Continued)

OTHER PUBLICATIONS

International Search Report and Written Opinion issued for PCT Application No. PCT/US2021/018489 issued Apr. 29, 2021, 15 pages.

*Primary Examiner* — Robert A Hopkins
(74) *Attorney, Agent, or Firm* — Benesch Friedlander Coplan & Aronoff LLP

(57) ABSTRACT

A dry material transfer pump comprises an outer tube including an outer tube channel having an upstream end that is axially aligned with a downstream end thereof, and a plenum portion having a cross-sectional width that is larger than a cross-sectional width of the outer tube channel. A pressurized gas inlet is defined through the outer tube and is in fluid communication with the plenum portion. An inner tube is disposed annularly within the outer tube channel and defines an inner tube channel configured to receive particulate matter. At least one opening is defined radially through a wall of the inner tube and fluidly couples the plenum (Continued)

portion to the inner tube channel to allow the pressurized gas to flow from the plenum portion into the inner tube channel and create suction within the inner tube channel for drawing the particulate matter through the inner tube channel.

21 Claims, 10 Drawing Sheets

(56) References Cited

U.S. PATENT DOCUMENTS

| | | | |
|---|---|---|---|
| 4,487,553 | A | 12/1984 | Nagata |
| 6,322,327 | B1 | 11/2001 | Dawson et al. |
| 9,273,649 | B2 | 3/2016 | Gomez et al. |
| 10,543,443 | B2 | 1/2020 | Hoff et al. |
| 2008/0178592 | A1 | 7/2008 | Bering |
| 2010/0071978 | A1 | 3/2010 | Kisse |
| 2012/0036843 | A1 | 2/2012 | Schertz et al. |
| 2015/0275831 | A1 | 10/2015 | Chlystek et al. |
| 2015/0345439 | A1 | 12/2015 | Gomez et al. |
| 2019/0275453 | A1 | 9/2019 | Gleixner et al. |

FOREIGN PATENT DOCUMENTS

| | | |
|---|---|---|
| EP | 2 960 483 A1 | 12/2015 |
| GB | 2 433 220 A | 6/2007 |
| WO | WO-2015/065266 A1 | 5/2015 |
| WO | WO-2019/145136 A1 | 8/2019 |

* cited by examiner

FIG. 1

PARTICULATE MATTER EVACUATION PUMP

CROSS REFERENCE TO RELATED APPLICATIONS

The present application is a national stage of PCT Application No. PCT/US2021/018489, filed Feb. 18, 2021, which claims priority to and the benefit of U.S. Provisional Patent Application No. 62/983,168, filed Feb. 28, 2020. The contents of these applications are incorporated herein by reference in their entirety and for all purposes.

TECHNICAL FIELD

The present disclosure relates generally to dry material transfer pumps for removing particulate matter collected in filter assemblies.

BACKGROUND

Air cleaners used in heavy dust environments often include precleaners which are devices used to separate some amount of particulate matter such as dust, organic particles (e.g., carbon based particles), inorganic particles (e.g., silica based particles such as sand), mining debris, etc., which in some cases may also include small amount of liquid (e.g., water or aerosols), from an air stream without the use of fibrous media. With precleaners, the separated particulate matter is often contained in a volume, which has to be later removed from the precleaner. Existing methods of removing the collected particulate matter, such as exhaust aspiration, can be expensive. Other methods, such as using a dust evacuator valve or manual emptying of a dust collection chamber of such air cleaners, can be inefficient and/or cumbersome to users.

SUMMARY

Embodiments described herein relate generally to a dry material transfer pump that is structured to remove particulate matter from a filter assembly such as an air filter assembly.

In some embodiments, a dry material transfer pump comprises an outer tube and an inner tube. The outer tube comprises an outer tube channel having an upstream end that is axially aligned with a downstream end of the outer tube channel. A plenum portion is defined along a length of the outer tube channel. The plenum portion has a cross-sectional width that is larger than a cross-sectional width of the outer tube channel. A pressurized gas inlet is defined through the outer tube and is in fluid communication with the plenum portion. An inner tube is disposed annularly within the outer tube channel. The inner tube defines an inner tube channel having an inlet configured to receive particulate matter. At least one opening is defined radially through a wall of the inner tube. The at least one opening fluidly couples the plenum portion to the inner tube channel so as to allow pressurized gas provided via the pressurized gas inlet to flow from the plenum portion into the inner tube channel and create suction within the inner tube channel for drawing the particulate matter through the inner tube channel.

In some embodiments, a dry material transfer pump comprises a tube assembly comprising: an upstream tube portion, and a downstream tube portion. The upstream tube portion comprises: an outer tube defining an outer tube channel having an inlet configured to receive particulate matter, a pressurized gas inlet defined radially through the outer tube in a downstream portion of the outer tube, and an inner tube disposed within the outer tube. The inner tube is coupled to an inner surface of the outer tube at a location upstream of the pressurized gas inlet and extends axially through the outer tube. At least one opening is defined through a wall of the inner tube. An upstream end of the downstream tube portion is coupled to a downstream end of the outer tube such that the downstream portion of the outer tube and an annular wall of the downstream tube portion are disposed around the inner tube so as to form a plenum portion between the inner tube, the downstream portion of the outer tube, and the annular wall of the downstream tube portion. The at least one opening fluidly couples the plenum portion to the inner tube.

In some embodiments, a method for removing particulate matter from an air cleaner system comprising a precleaner, comprises: fluidly coupling a dry material transfer pump to a port of a particulate matter collection chamber of the precleaner. The dry material transfer pump comprises an outer tube, comprising: an outer tube channel having an upstream end that is axially aligned with a downstream end of the outer tube channel, a plenum portion defined along a length of the outer tube channel and having a cross-sectional width that is larger than a cross-sectional width of the outer tube channel, and a pressurized gas inlet defined through the outer tube and in fluid communication with the plenum portion. An inner tube is disposed annularly within the outer tube channel, the inner tube defining an inner tube channel having an inlet fluidly coupled to the port and configured to receive the particulate matter, at least one opening defined radially through a wall of the inner tube, the at least one opening fluidly coupling the plenum portion to the inner tube channel. The method also includes communicating pressurizing gas to a pressurized gas inlet of the dry material transfer pump, the pressurized gas being provided from a pressurized gas system included in a vehicle. The pressurized gas creates suction in the dry material transfer pump causing particulate matter collected in a particulate matter collection chamber to be drawn into the dry material transfer pump and expelled into the environment through an outlet of the dry material transfer pump with the pressurized gas.

In some embodiments, a method for removing particulate matter from an air cleaner system including a precleaner, comprises: fluidly coupling a dry material transfer pump to a port of a particulate matter collection chamber of the precleaner. The method also includes communicating pressurizing gas to a pressurized gas inlet of the dry material transfer pump, the pressurized gas being provided from a compressor included in a vehicle. The pressurized gas creates suction in the dry material transfer pump causing particulate matter collected in the particulate matter collection chamber to be drawn into the dry material transfer pump and expelled into the environment through an outlet of the dry material transfer pump with the pressurized gas.

In some embodiments, an air cleaner system, comprises a precleaner including a material collection chamber. A dry material transfer pump is coupled to the particulate matter collection chamber, the dry material transfer pump including a pressurized gas inlet configured to receive pressurized gas so as to cause the dry material transfer pump to remove particulate matter from the particulate matter collection chamber. A valve is disposed upstream of the pressurized gas inlet. An air filter comprising an air filter housing, is disposed downstream of the precleaner. A pressure sensing device is coupled to the air filter housing. A controller is operably coupled to the valve and the pressure sensing device. The controller is configured to determine a pressure within the air filter housing based on a signal received from the pressure sensing device and to selectively activate the valve based on the pressure within the air filter housing so as to selectively activate the dry material transfer pump.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 1 is a side elevation view of a dry material transfer pump, according to an embodiment.

Figure 2:
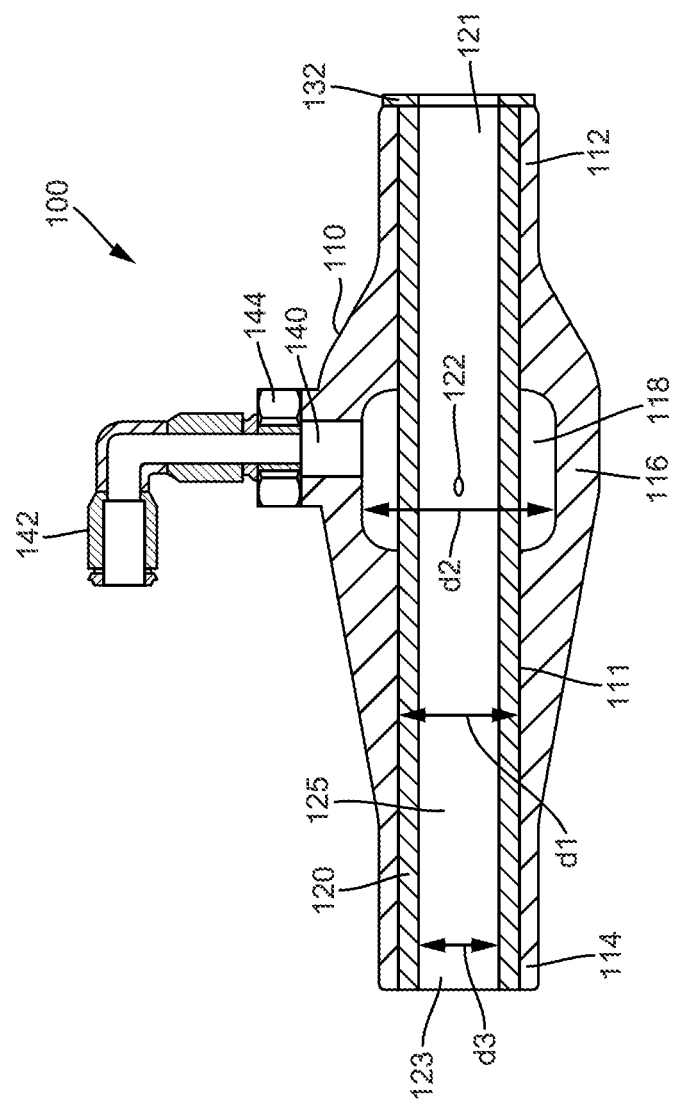
FIG. 2 is a side cross-section view of the dry material transfer pump of FIG. 1 taken along the line X-X in FIG. 1.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to a dry material transfer pump that is structured to remove particulate matter from an assembly such as an air filter assembly.

Embodiments of the dry material transfer pumps described herein may provide one or more benefits including, for example: (1) allowing selective removal of particulate matter from a filter assembly such as an air precleaner in an automated and reliable fashion; (2) reducing wear of internal components of the dry material transfer pump by using wear resistant material within the dry material transfer pump; and (3) allowing various sources of pressurized gas such as compressed air to be used for pumping particulate matter through the dry material transfer pump.

While various embodiments described herein refer to a "dry" material transfer pump it should be appreciated that in some instances liquids (e.g., water, aerosols, etc.) may also enter the dry material transfer pump along with the particulate matter from filter assembly and be removed from filter assembly with the particulate matter by the dry material transfer pump.

Figure 1:
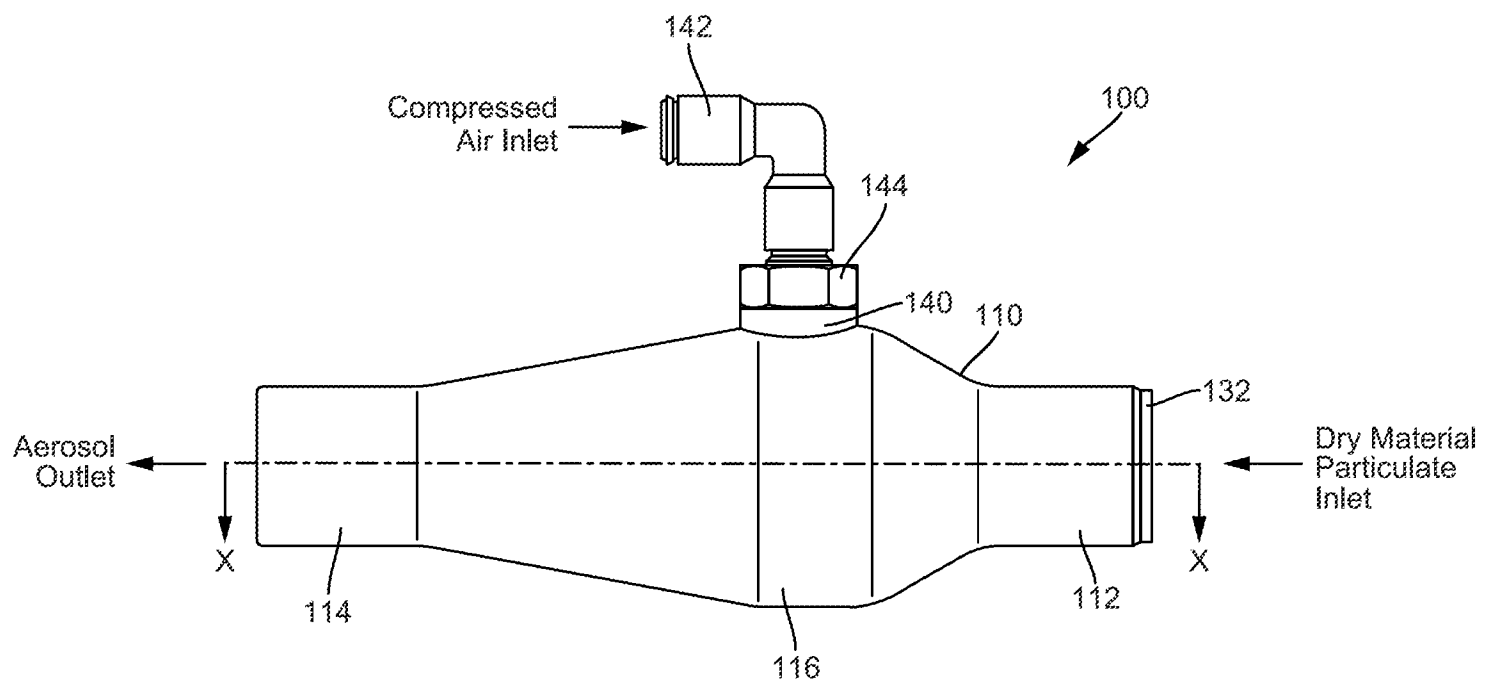

FIGS. 1-2 show a dry material transfer pump 100 (hereinafter "pump 100"), according to an embodiment. The pump 100 includes an outer tube 110 and an inner tube 120 disposed annularly within the outer tube 110. The outer tube 110 may be formed from any suitable material, for example, aluminum, stainless steel, etc. The outer tube 110 defines an outer tube channel 111 having an upstream end 112 and a downstream end 114 that is axially aligned with the upstream end 112. The upstream end 112 is configured to be coupled to a filter assembly, for example, an air precleaner, and is configured to receive particulate matter from the filter assembly.

The outer tube 110 includes a plenum portion 118 defined within the outer tube 110 and located along a length of the outer tube channel 111, for example, proximate to a central portion of the outer tube channel 111. The plenum portion 118 has a cross-sectional width d2 (e.g., diameter) that is larger than a cross-sectional width d1 (e.g., diameter) of the outer tube channel 111. For example, the plenum portion 118 may include a portion of the outer tube channel 111 that has a larger cross-sectional width d2 than the cross-sectional width d1 of the outer tube channel 111.

A pressurized gas inlet 140 is defined through the outer tube 110 and is in fluid communication with the plenum portion 118. A pressurized gas tube 142 is coupled to the inlet via a coupling member 144 (e.g., a screw or nut) or may be threaded into the pressurized gas inlet 140. The pressurized gas tube 142 is configure to provide pressurized gas, for example, compressed air into the plenum portion 118. In some embodiments, the pressurized gas inlet 140 may be defined radially through the outer tube 110. For example, the pressurized gas inlet 140 may be oriented orthogonally (e.g., at an angle of about 90 degrees) with respect to a longitudinal axis of the pump 100.

In some embodiments, a washer 132 (e.g., a metal washer) may be removably disposed at the upstream end 112 of the outer tube 110 from which particulate matter (e.g., dust, organic particles, inorganic particles, mining debris, etc., which in some cases may also include small amount of liquid) enters the pump 100. In some embodiments, the washer 132 may be formed from a wear or erosion resistant material (e.g., ceramics). In other embodiments, the washer 132 may be formed from metals that can erode. In such embodiments, the washer 132 may be replaced with a new washer once the washer 132 has been eroded beyond an erosion threshold.

The inner tube 120 is disposed annularly within the outer tube channel 111. The inner tube defines an inner tube channel 125 having a cross-sectional width d3 (e.g., diameter) that is smaller than the diameter d2 of the outer tube channel 111. In some embodiments, the inner tube 120 may be formed from a wear and erosion resistant material, for example, ceramics. In such embodiments, the outer tube 110 may be formed from a cheaper and lesser erosion resistant material, for example, metals (e.g., aluminum or stainless steel). This can reduce the overall manufacturing cost of the pump 100.

Figure 3:
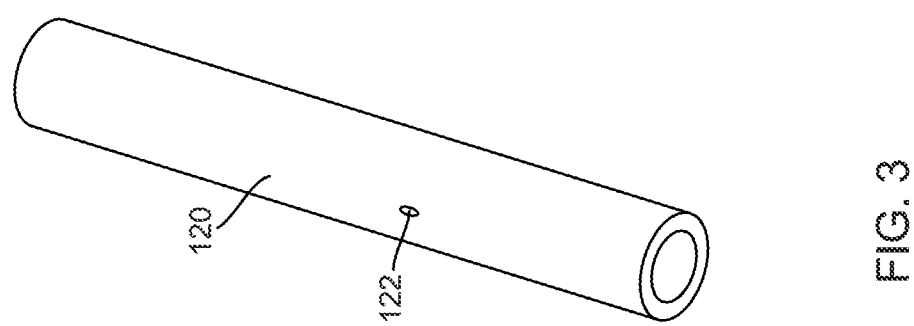
FIG. 3 is a front perspective view of an inner tube of the dry material transfer pump of FIG. 1, according to an embodiment.
Figure 4:
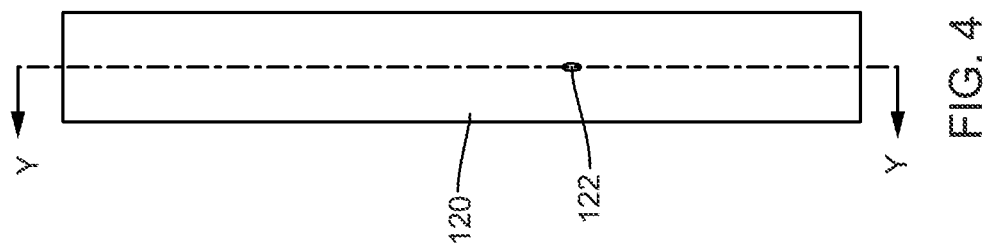
FIG. 4 is a side elevation view of the inner tube of FIG. 3.
Figure 5:
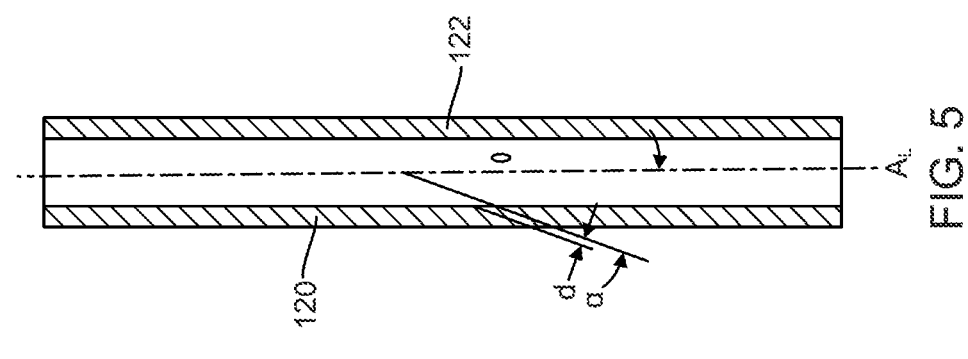
FIG. 5 is a side cross-section view of the inner tube of FIG. 3 taken along the line Y-Y in FIG. 4.

The inner tube 120 is configured to receive particulate matter via an inlet 121 thereof located proximate to the upstream end 112 of the outer tube 110. While shown in FIG. 2 as having the same length as the outer tube 110 and being co-extensive with the outer tube 110, in other embodiments, the inner tube 120 may be longer or shorter than the outer tube 110. As shown in FIGS. 3-5, at least one opening 122 (e.g., 1, 2, 3, or even more) is defined radially through a wall of the inner tube 120 such that the plenum portion 118 is disposed around a portion of the inner tube 120 where the at least one opening 122 is formed. Pressurized air communicated into the plenum portion 118 circulates around the inner tube 120 and is communicated into the inner tube channel 125 via the at least one opening 122.

In some embodiments, the at least one opening 122 may be inclined at an angle α with respect to a longitudinal axis $A_L$ of the inner tube 120 towards an outlet 123 of the inner tube 120 so as to allow the pressurized gas to flow from the plenum portion 118 towards the outlet 123. The angle α may be an acute angle, for example, in a range of 10 degrees to 60 degrees (e.g., 10, 15, 20, 25, 30, 35, 40, 45, 50, 55, or 60 degrees, inclusive).

In some embodiments, a plurality of openings 122 may be defined through the inner tube. The plurality of openings 122 may be equally spaced along a periphery of the inner tube 120, for example, separated by equal radial angles. For example, the inner tube 120 may define three openings therethrough, each being offset from each other by a radial angle of 120 degrees. In some embodiments, each of the at least one opening 122 may have a diameter in a range of 0.10 centimeters to 0.15 centimeters, inclusive.

The one or more openings 122 fluidly couple the plenum portion 118 to the inner tube channel 125 so as to allow the pressurized gas to flow from the plenum portion 118 into the inner tube channel 125 and create negative pressure or suction within the inner tube channel 125. The negative pressure draws the particulate matter into the inner tube channel 125 from the inlet 121.

In operation, the pressurized gas inlet 140 receives relatively clean gas (e.g., air) from a pressurized gas source. The one or more openings 122 redirect the pressurized gas towards the outlet 123 urging the compressed gas and particulate matter to flow towards the outlet 123. This results in a suction force at the inlet 121 and positive pressure at the outlet 123. The particulate matter (e.g., dust) enters the inner tube channel 125 because of the suction pressure created by the high velocity pressurized gas. The outlet 123 is on the opposite end of the inlet 121 which is where the pressurized gas mixed with the particulate matter exits the pump 100 (e.g., is expelled into the environment).

Because the inlet 121 is axially aligned with the outlet 123, the particulate matter flows in a nearly straight path through the inner tube channel 125 along the longitudinal axis $A_L$. By flowing through a straight path instead of a curved or bent path, the particulate matter has a lower chance of impacting the wall of the inner tube 120, which reduces erosion. Furthermore, the inner tube 120 may be formed from erosion resistant materials (e.g., ceramics) further reducing erosion and extending the operational life of the pump 100.

Figure 6:
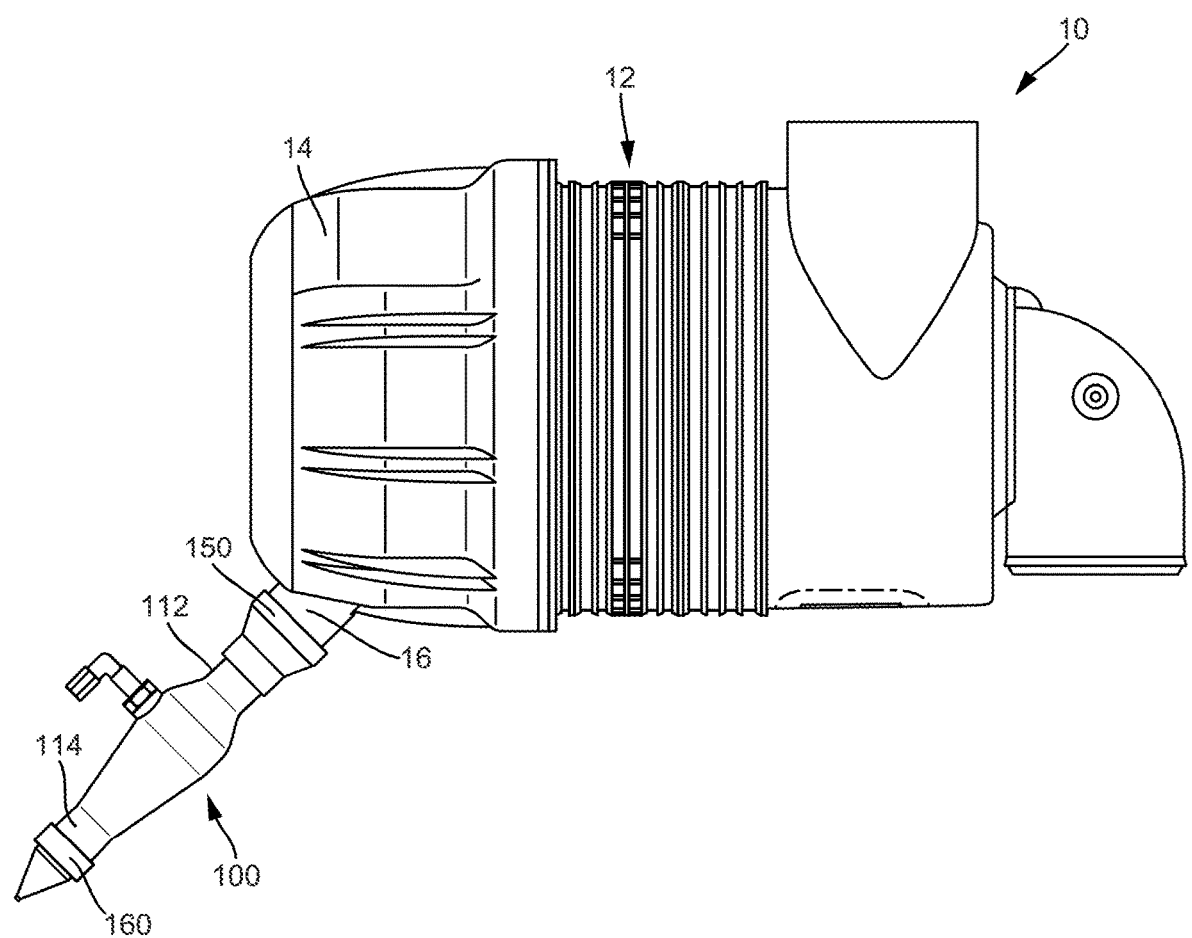
FIG. 6 is a side elevation view of a filter assembly having the dry material transfer pump of FIG. 1 coupled thereto, according to an embodiment.
Figure 7:
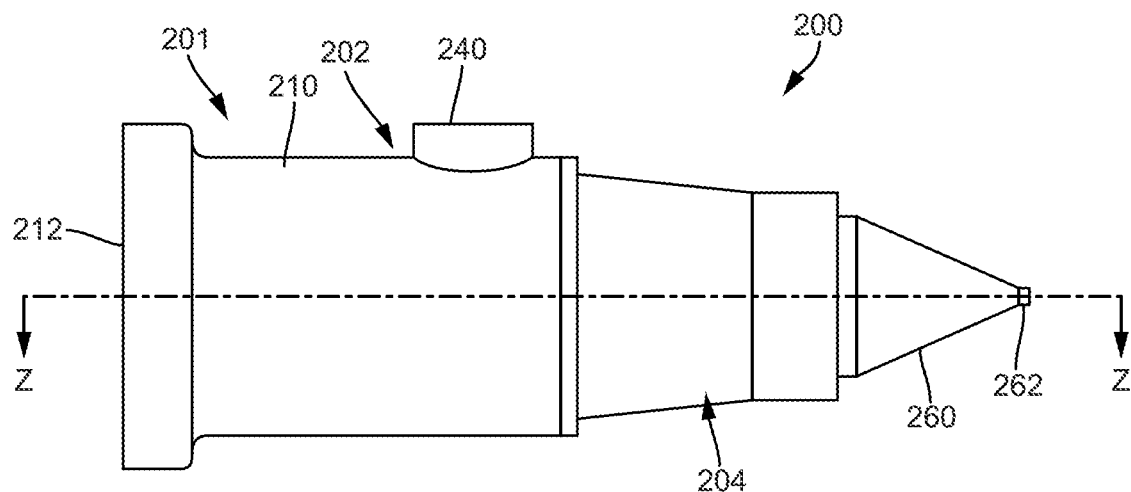
FIG. 7 is a side elevation view of a dry material transfer pump, according to another embodiment.

FIG. 6 shows a filter assembly 10 that includes an air precleaner 12, according to an embodiment. The air precleaner 12 includes a particulate matter collection chamber 14. The upstream end 112 of the pump 100 is coupled to a port 16 defined in the collection chamber 14 of the precleaner 12 via an inlet coupling member 150 (e.g., a coupling tube). A valve 160 (e.g., a duckbill valve, etc.) is coupled to the downstream end 114 of the pump 100 and configured to allow the particulate matter entrained in the pressurized gas to be expelled through the valve 160 when pressurized gas is being provided to the pump 100, while preventing ambient air from the entering the pump 100 when the pressurizes gas supply to the pump 100 is stopped. Thus, collected particulate matter can be selectively evacuated from the collection chamber 14 in an automated fashion.

FIGS. 7-10 show various views of a dry material transfer pump 200 (hereinafter "pump 200"), according to another embodiment. The pump 200 includes a tube assembly 201 including an upstream tube portion 202, and a downstream tube portion 204 coupled to the upstream tube portion 202. The upstream tube portion 202 includes an outer tube 210 defining an outer tube channel 211 and an inlet 212 configured to receive particulate matter. An inner tube 220 is disposed within the outer tube 210.

Figure 8:
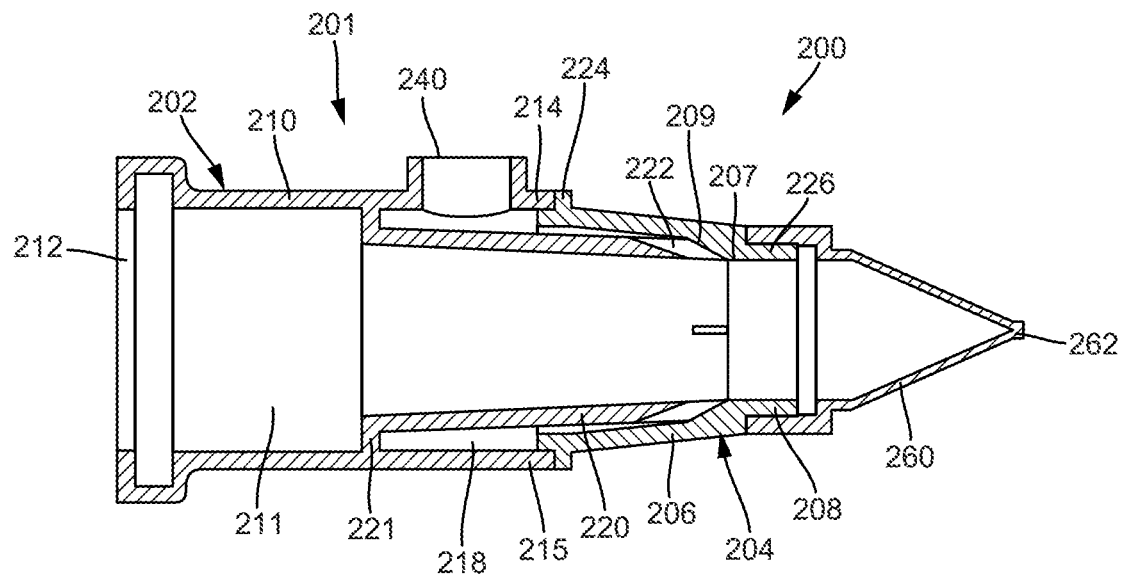
FIG. 8 is a side cross-section view of the dry material transfer pump of FIG. 7 taken along the line Z-Z in FIG. 7.
Figure 9:
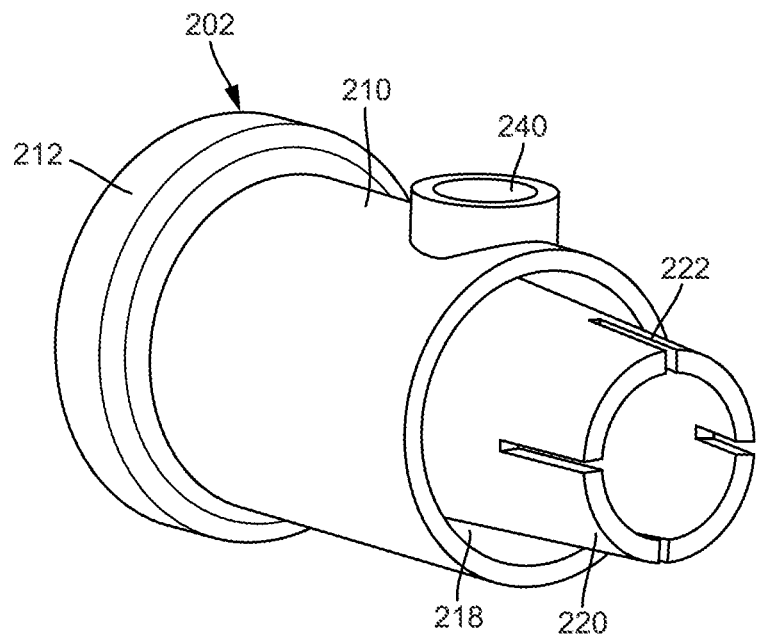
FIG. 9 is a front perspective view of an inlet portion of a tube assembly included in the pump of FIG. 8.
Figure 10:
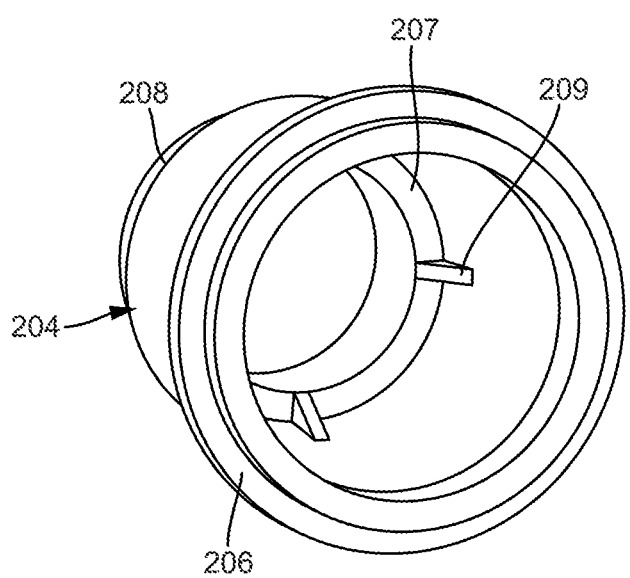
FIG. 10 is a rear perspective view of an outlet portion of the tube assembly included in the pump of FIG. 8.

The inner tube 220 is disposed within the outer tube 210. The inner tube 220 is coupled to an inner surface of the outer tube 210 at a location upstream of a pressurized gas inlet 240, and extends axially through the outer tube 210. For example, as shown in FIG. 8, a ledge 221 extends radially from an inner surface of the outer tube channel 211 at a downstream end of the outer tube channel 211. The inner tube 220 extends from a rim of the ledge 221 axially away from the ledge 221 beyond a downstream end 214 of the outer tube 210. At least one opening 222 is defined through a wall of the inner tube 220. For example, as shown in FIG. 9, a plurality of openings 222 (e.g., axial openings such as slits) are defined through a wall of the inner tube 220 proximate to a downstream end of the inner tube 220. The inner tube 220 may be formed monolithically with the outer tube 210. In some embodiments, the plurality of openings 222 may be inclined towards a downstream end of the inner tube 220 at an acute angle with respect to a longitudinal axis of the pump 200, for example, an angle in a range of 10 degrees to 60 degrees (e.g., 10, 15, 20, 25, 30, 35, 40, 45, 50, 55, or 60 degrees, inclusive).

In some embodiments, an upstream end of the inner tube 220 may have a larger cross-sectional width (e.g., diameter) relative to a cross-sectional width (e.g., diameter) of the downstream end of the inner tube 220. In some embodiments, the plurality of openings may be equally spaced along a periphery of the inner tube 120, for example, separated by equal radial angles. For example, the inner tube 120 may define four openings 222 therethrough, each being offset from each other by a radial angle of 90 degrees. Moreover, the plurality of openings 222 may have a length that is shorter than a length of the inner tube 220.

The downstream tube portion 204 includes an annular wall 206. An upstream end 224 of the downstream tube portion 204 is coupled to the downstream end 214 of outer tube 210. A downstream portion 215 of the outer tube 210 downstream of the ledge 221 and the annular wall 206 are disposed around the inner tube 220 such that a plenum portion 218 is formed between the inner tube 220, and the downstream portion 215 of the outer tube 210 and the annular wall 206. A pressurized gas inlet 240 is defined through the outer tube 210 (e.g., radially through the outer tube 210) in the downstream portion 215 and configured to communicate pressurized gas into the plenum portion 218 and through the plurality of openings 222 into the inner tube 220.

The downstream tube portion 204 defines a shoulder 207 extending radially inwards into the downstream tube portion 204. A downstream end of the inner tube 220 abuts the shoulder 207 when the downstream tube portion 204 is coupled to the upstream tube portion 202. A plurality of angular ribs 209 extend from the shoulder 207 to an inner surface of the downstream tube portion 204 and are configured to be inserted part way into corresponding openings 222 of the inner tube 220, for example, to serve as alignment features for properly aligning the upstream tube portion 202 relative to the downstream tube portion 204.

A valve 260 (e.g., a duckbill valve) is coupled to a downstream end 226 of the downstream tube portion 204 and configured to allow the particulate matter entrained in the pressurized gas to be expelled through an outlet 262 of the valve 260 when pressurized gas is being provided to the pump 200, while preventing ambient air from the entering the pump 200 when the pressurizes gas supply to the pump 200 is stopped. In various embodiments, each of the components of the pump 200 can be formed from low cost moldable materials, for example, injection molded plastic or rubber.

Figure 11:
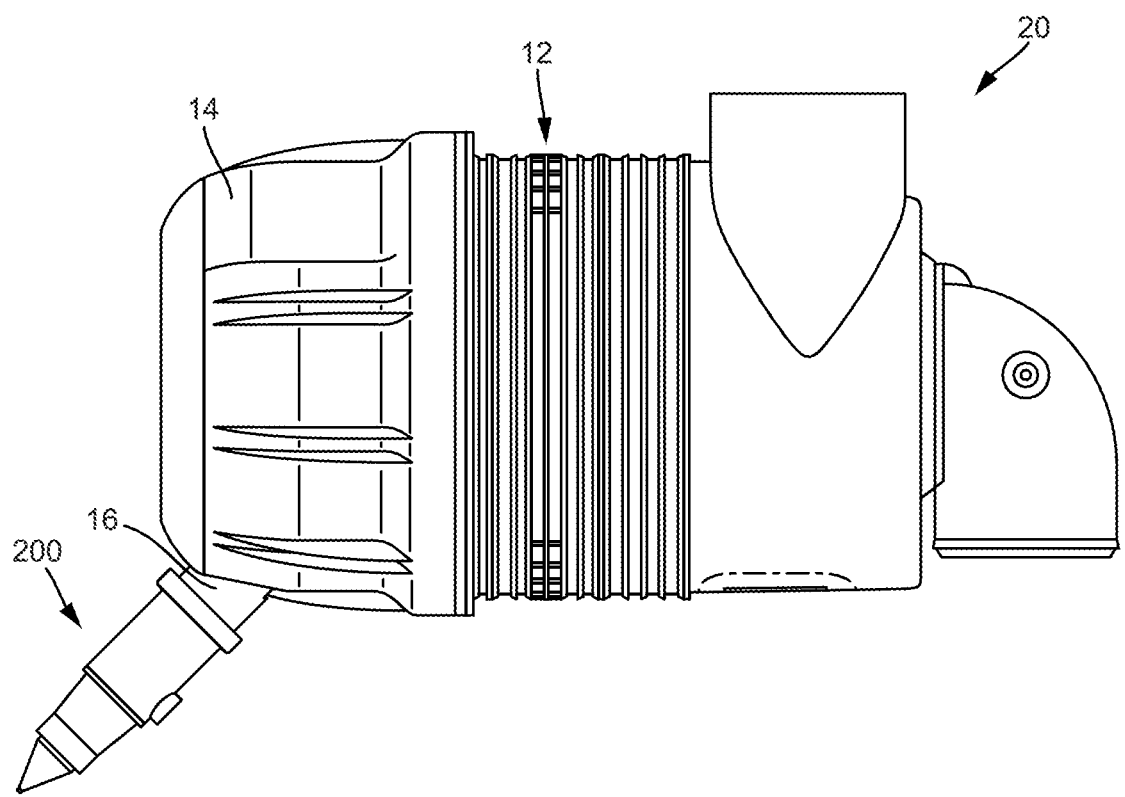
FIG. 11 is a side elevation view of the filter assembly of FIG. 6 having the dry material transfer pump of FIG. 8 coupled thereto, according to an embodiment.

FIG. 11 shows the pump 200 being coupled to the port 16 of the air precleaner 12. Similar to the pump 100, the pump 200 facilitates selective evacuation of collected particulate matter from the collection chamber 14 of the air precleaner 12 in an automated fashion.

Figure 12:
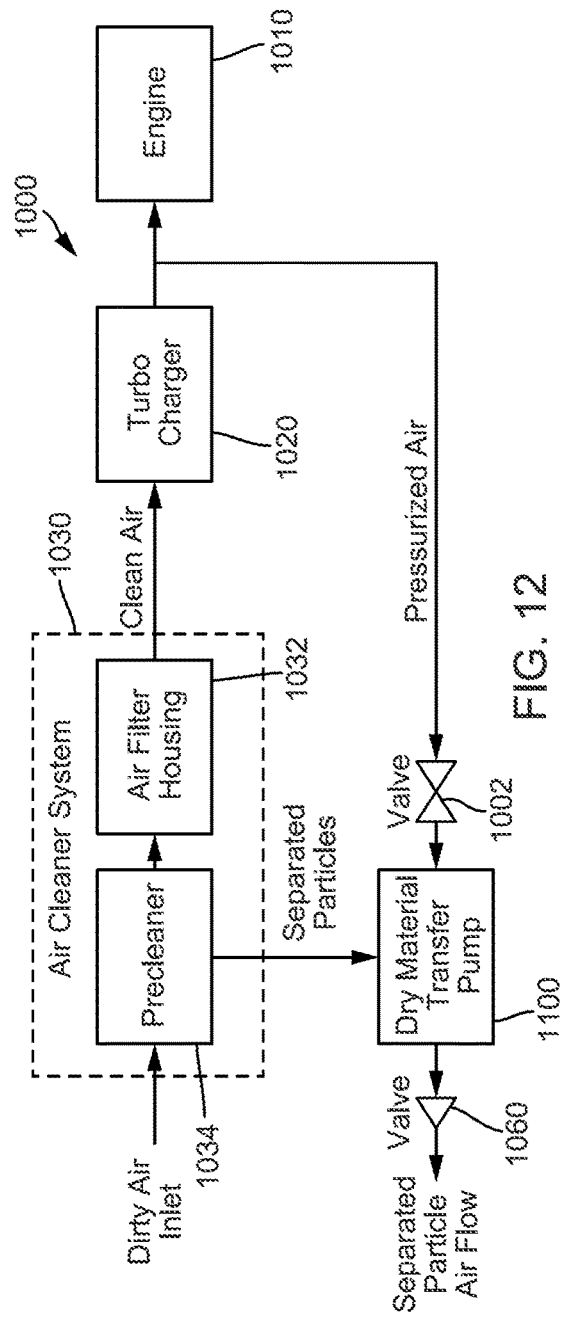
FIG. 12 is a schematic block diagram of a system for providing pressurized air to a dry material transfer pump, according to an embodiment.

Various pressurized gas, for example, pressurized air sources may be use to provide pressurized gas to the pump 100, 200. For example, FIG. 12 is a schematic block diagram of a system 1000 for providing pressurized air to a dry material transfer pump 1100 (e.g., the pump 100, 200), according to an embodiment. The system 1000 includes an air cleaner system 1030 including a precleaner 1034 (e.g., the precleaner 12) configured to clean dirty air, and an air filter including an air filter housing 1032. The pump 1100 is fluidly coupled to the precleaner 1034.

The air cleaner system 1030 provides clean air to a turbocharger 1020 that pressurizes the air and provides the pressurized air to an engine 1010 (e.g., a gasoline or diesel engine). A portion of the pressurized air is selectively provided to the pump 1100 from the turbocharger 1020 via a first valve 1002 and dirty air including particulate matter drawn from the precleaner 1034 by the pump 1100, is expelled from the pump via a second valve 1060 (e.g., a duck bill valve). In some embodiments, the first valve 1002 may include a normally closed, solenoid valve that opens when it receives an electrical signal, i.e., the first valve 1002 may be selectively activated to provide pressurized air to the pump 1100.

Scavenging some of the pressurized air which provides boost pressure to the engine 1010 may cause the engine 1010 to experience some performance loss. To prevent such losses, this pressurized air source may only be used under certain engine operating conditions, for example, when the engine 1010 drops in speed over a relatively short time span and much of the boost pressure would be wasted anyway.

Figure 13:
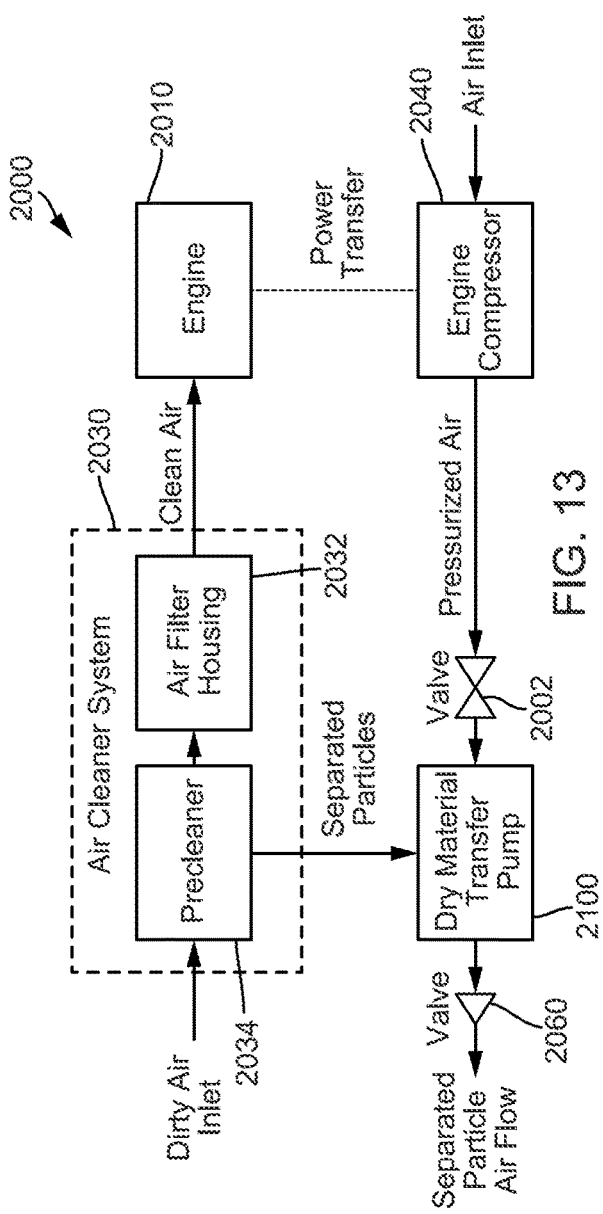
FIG. 13 is a schematic block diagram of a system for providing pressurized air to a dry material transfer pump, according to another embodiment.

FIG. 13 is a schematic block diagram of a system 2000 for providing pressurized air to a pump 2100 (e.g., the pump 100 or 200), according to another embodiment. The system 2000 includes an air cleaner system 2030 including an air precleaner 2034, an air cleaner including an air filter housing 2032, the pump 2100, a first valve 2002 disposed upstream of the pump 3100 (e.g., the first valve 2002), and a second valve 2060 (e.g., the valve 160, 260) disposed downstream of the pump 2100, similar to the system 1000. However, different from the system 1000, the system 2000 does not include a turbocharger. Instead, an engine 2010 drives a compressor 2040 that pressurizes ambient air and provides pressurized air to the pump 2100. The compressor 2040 may be part of an air brake or air suspension system of a vehicle such as a dump truck, a concrete mixer, or long haulers.

Figure 14:
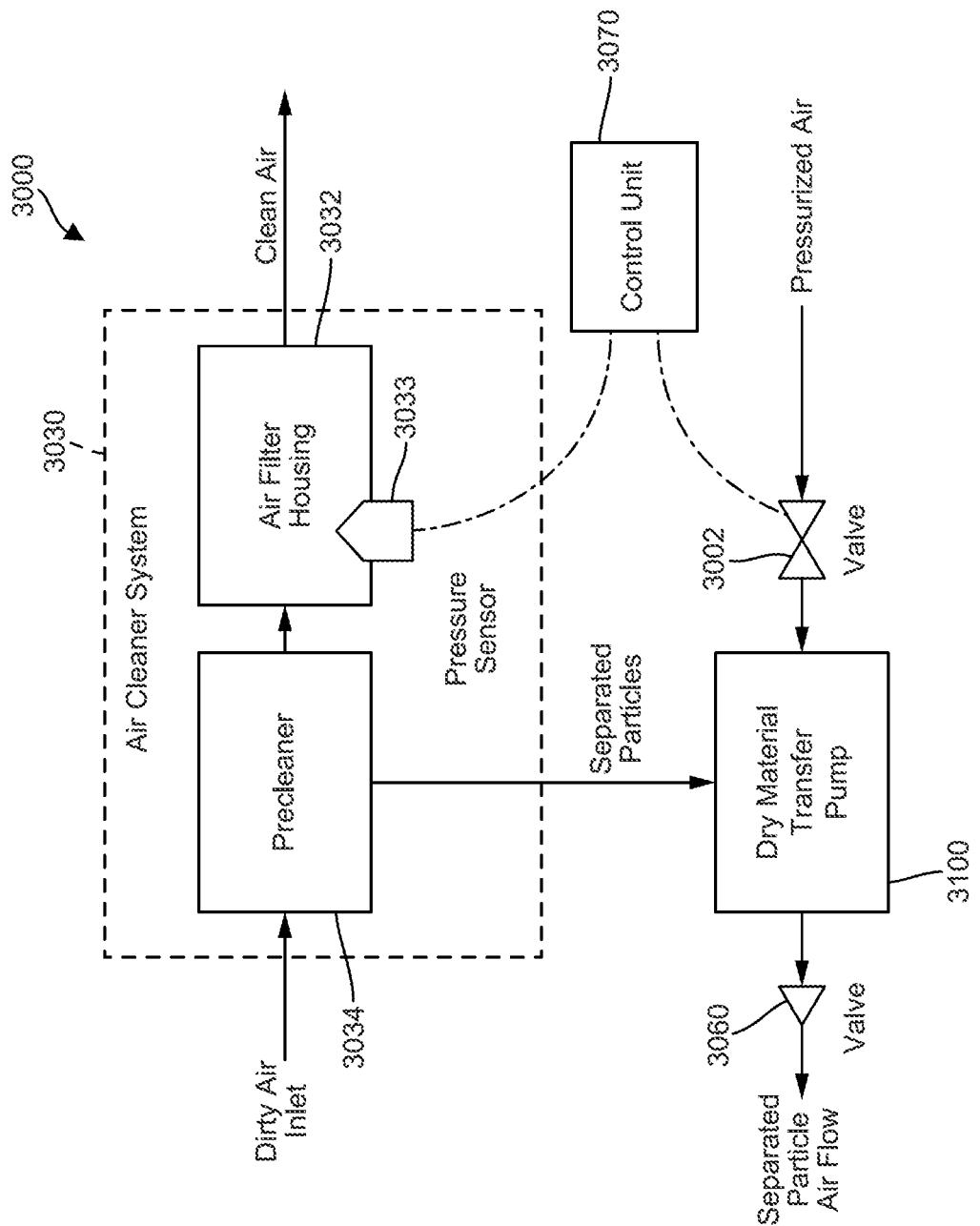
FIG. 14 is a schematic block diagram of a system for providing pressurized air to a dry material transfer pump, according to yet another embodiment.

FIG. 14 is a schematic block diagram of a system 3000 for providing pressurized air to a pump 3100, according to yet another embodiment. The system 3000 includes an air cleaner system 3030 including an air precleaner 3034 and an air filter including an air filter housing 3032, the pump 3100, a first valve 3002 disposed upstream of the pump 3100 (e.g., the first valve 1002), and a second valve 3060 (e.g., the second valve 1060). However, the system 3000 also includes a pressure sensing device 3033 (e.g., a pressure sensor or a pressure switch) operatively coupled to the air filter housing 3032 and configured to measure a pressure within the air filter housing 3032. A control unit 3070 (e.g., a controller) is operatively coupled to the pressure sensing device 3033 and the first valve 3002 and configured to selectively open the first valve 3002 to provide pressurized air to the pump 3100 based on a pressure within the air filter housing 3032 measured by the pressure sensing device 3033. For example, the control unit 3070 may receive a signal from the pressure sensing device 3033 to determine a pressure within the air filter housing 3032, and activate the first valve 3002 at times of low flow rate through the air cleaner system 3030 because the internal static pressure is close to atmospheric pressure. Therefore, the pump 3100 will not have to overcome as much pressure to create flow out of the air filter housing 3032 and evacuate the particulate matter when compared to high flow conditions, for example during engine idle conditions and/or when a vehicle including the system 3000 is turned off. In other embodiments, instead of or in addition to activating the first valve 3002 in response to a signal received from the pressure sensing device 3033, the control unit 3070 may be configured to use a timer for activating the first valve 3002 so as to cause removal of the particulate matter from the precleaner 3034 over a control release period.

Figure 15:
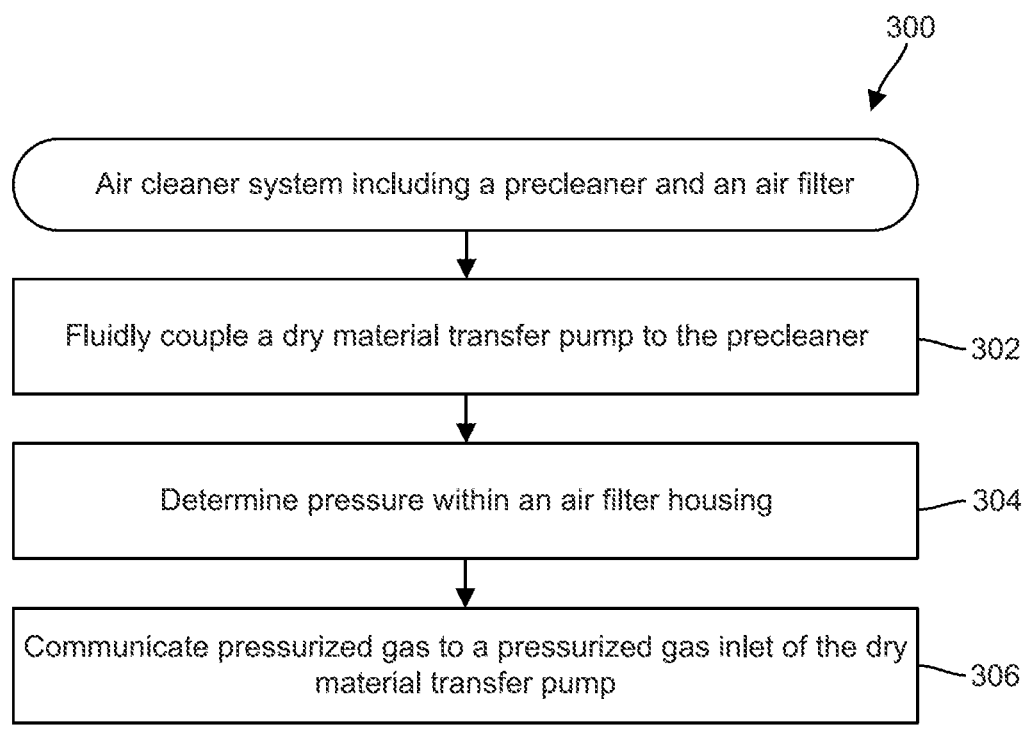
FIG. 15 is a schematic flow chart of a method for removing dry particulate matter from an air cleaner system including a precleaner and an air filter, according to an embodiment.

FIG. 15 is a schematic flow chart of a method 300 for removing particulate matter from an air cleaner system (e.g., the air cleaner system 1030, 2030, 3030) that includes a precleaner (e.g., the precleaner 12, 1034, 2034, 3034) and may also include an air filter that has an air filter housing (e.g., the air filter housing 1032, 2032, 3032). The method 300 includes fluidly coupling a dry material transfer pump to a port of a particulate matter collection chamber of the precleaner, at 302. For example, the dry material transfer pump 100, 200, 1100, 2100, or 3100 may be coupled to a port of the precleaner 12, 1034, 2034, 3034. In some embodiments, the method 300 may also include determining a pressure within an air filter housing of the air filter, at 304. For example, the pressure sensing device 3033 may be coupled to the air filter housing 1032, 2032, 3032 and configured to determine a pressure inside the air filter housing 1032, 2032, 3032.

At 306, pressurized air is communicated to a pressurized gas inlet (e.g., the pressurized gas inlet 140, 240) of the dry material transfer pump (e.g., the dry material transfer pump 100, 200, 1100, 2100, 3100). The pressurized air creates suction in the dry material transfer pump causing particulate matter collected in a particulate matter collection chamber to be drawn into the dry material transfer pump and expelled into the environment through an outlet of the dry material transfer pump with the pressurized gas. In some embodiments, a valve (e.g., the first valve 1002, 2002, 3002) may be disposed upstream of an inlet of the dry material transfer pump and configured to selectively provide the pressurized gas to the dry material transfer pump. In such embodiments, communicating the pressurized gas may include selectively activating the valve based on the pressure within the air filter housing.

The pressurized gas may be provided from a pressurized gas system included in a vehicle. In some embodiments, the pressurized gas includes pressurized air communicated from a turbocharger of a system including the precleaner. In other embodiments, the pressurized gas includes pressurized air provided by an air compressor of a system including the precleaner.

In summary, various embodiments described herein relate to dry material transfer pumps used for moving particulate substances dispersed in aerosol with the use of compressed air by means of a cylindrical volume with compressed air jet(s) directed into that volume at an angle that is acute with the intended direction of flow.

In some embodiments, an inlet and an outlet of dry material transfer pump are arranged axially in line with one another and compressed air jets are entered at an acute angle with respect to the center axis.

In some embodiments, any of the pumps described herein (e.g., pump 100, 200) may be used in a method of removing dust from an air cleaner system with a dust evacuator port which contains dust that has be separated by a precleaning system. Various dry material transfer pumps described herein may include a first valve (e.g., a two-way valve) at the compressed air inlet to control when the system is on or off and a second valve (e.g., a duck bill valve) at the dry material transfer pump outlet to prevent backflow into the system.

In some embodiments, the cylindrical volume with the transfer pump may be a tube made from a ceramic material to avoid erosion or wear from the high velocity dry material particles within the cylindrical volume.

In some embodiments, a method of supplying compressed air to a dry material transfer pump may include bleeding some air pressure from a turbocharger connected to an engine. In some embodiments, a method of supplying compressed air to dry material transfer pump may include taking air from a vehicle's onboard compressor used to supplier compressed air to air brakes, suspension, etc.

In some embodiments, a method of controlling an air cleaner aspiration unit (dry material transfer pump, fan, blower, etc.) which turns off and off aspiration device through logic in a control unit based on pressure inside the air cleaner housing as measured by a pressure sensing device (e.g., a pressure sensor or a pressure switch). For example, at engine conditions with low flow rates or no flow rate, pressure is close to atmospheric and may be an optimal time to remove dust form the housing of an air precleaner since the aspiration device does not have to overcome much pressure to remove air flow and material from the housing.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A dry material transfer pump, comprising: an outer tube, comprising:
   an outer tube channel having an upstream end that is axially aligned with a downstream end of the outer tube channel,
   a plenum portion defined along a length of the outer tube channel and having a cross-sectional width that is larger than a cross-sectional width of the outer tube channel, and
   a pressurized gas inlet defined through the outer tube and in fluid communication with the plenum portion; and
   an inner tube disposed annularly within the outer tube channel and engaged with an inner surface of the outer tube upstream and downstream of the plenum, the inner tube defining an inner tube channel having an inlet configured to receive particulate matter, at least one opening defined radially through a wall of the inner tube, the at least one opening fluidly coupling the plenum portion to the inner tube channel so as to allow pressurized gas provided via the pressurized gas inlet to flow from the plenum portion into the inner tube channel and create suction within the inner tube channel for drawing the particulate matter through the inner tube channel.

2. Dry material transfer pump of claim 1, wherein at least one opening is inclined at an angle with respect to a longitudinal axis of the inner tube towards an outlet of the inner tube so as to cause the pressurized gas to flow from the plenum portion towards the outlet.

3. The dry material transfer pump of claim 2, wherein the angle is an acute angle.

4. The dry material transfer pump of claim 2, wherein the inner tube defines a plurality of openings, the plurality of openings being equally spaced along a periphery of the inner tube.

5. The dry material transfer pump of claim 1, further comprising a washer removably coupled to an upstream end of the outer tube.

6. The dry material transfer pump of claim 1, wherein the inner tube is formed from a wear resistant material.

7. An air cleaner system, comprising:
   a precleaner including a dry material collection chamber;
   the dry material transfer pump of claim 1, the dry material transfer pump coupled to the particulate matter collection chamber.

8. A dry material transfer pump, comprising: an outer tube, comprising:
   an outer tube channel having an upstream end that is axially aligned with a downstream end of the outer tube channel,
   a plenum portion defined along a length of the outer tube channel and having a cross-sectional width that is larger than a cross-sectional width of the outer tube channel, and
   a pressurized gas inlet defined through the outer tube and in fluid communication with the plenum portion;
   an inner tube disposed annularly within the outer tube channel, the inner tube defining an inner tube channel having an inlet configured to receive particulate matter, at least one opening defined radially through a wall of the inner tube, the at least one opening fluidly coupling the plenum portion to the inner tube channel so as to allow pressurized gas provided via the pressurized gas inlet to flow from the plenum portion into the inner tube channel and create suction within the inner tube channel for drawing the particulate matter through the inner tube channel; and
   a valve coupled to a downstream end of the outer tube, the valve configured to:
   allow the particulate matter entrained in the pressurized gas to be expelled through the valve, when the pressurized gas is being provided to the dry material transfer pump, and
   prevent ambient air from entering the dry material transfer pump when the pressurized gas supply to the dry material transfer pump is stopped.

9. A dry material transfer pump, comprising:
   a tube assembly, comprising:
     an upstream tube portion, comprising:
       an outer tube defining an outer tube channel having an inlet configured to receive particulate matter,
       a pressurized gas inlet defined radially through the outer tube in a downstream portion of the outer tube, and
       an inner tube disposed within the outer tube, the inner tube coupled to an inner surface of the outer tube at a location upstream of the pressurized gas inlet and extending axially through the outer tube, at least one opening defined through a wall of the inner tube; and
     a downstream tube portion, an upstream end of the downstream tube portion coupled to a downstream end of the outer tube such that the downstream portion of the outer tube and an annular wall of the downstream tube portion are disposed around the inner tube so as to form a plenum portion between the inner tube, the downstream portion of the outer tube, and the annular wall of the downstream tube portion, the at least one opening fluidly coupling the plenum portion to the inner tube.

10. The dry material transfer pump of claim 9, further comprising a ledge extending radially from an inner surface of the outer tube channel at the location upstream of the pressurized gas inlet,
    wherein the inner tube extends from a rim of the ledge axially away from the ledge.

11. The dry material transfer pump of claim 10, wherein the inner tube extends beyond the downstream end of the outer tube.

12. The dry material transfer pump of claim 9, wherein the at least one opening is inclined towards a downstream end of the inner tube at an acute angle with respect to a longitudinal axis of the pump.

13. The dry material transfer pump of claim 9, wherein:
    the downstream tube portion defines a shoulder extending radially inwards into the downstream tube portion, and
    at least one angular rib extends from the shoulder to an inner surface of the downstream tube portion, the at least one angular rib inserted part way into the at least one opening of the inner tube.

14. The dry material transfer pump of claim 9, further comprising:
    a valve coupled to the downstream end of the outer tube, the valve configured to:
    allow particulate matter entrained in a pressurized gas being provided via the pressurized gas inlet to be expelled through the valve, and
    prevent ambient air from entering the dry material transfer pump when the pressurized gas supply to the dry material transfer pump is stopped.

15. An air cleaner system, comprising:
a precleaner including a dry material collection chamber;
the dry material transfer pump of claim 9, the dry material transfer pump coupled to the particulate matter collection chamber.

16. The air cleaner system of claim 15, further comprising:
a valve disposed upstream of the pressurized gas inlet;
an air filter comprising an air filter housing, the air filter disposed downstream of the precleaner;
a pressure sensing device coupled to the air filter housing; and
a controller operably coupled to the valve and the pressure sensing device, the controller configured to:
determine a pressure within the air filter housing based on a signal received from the pressure sensing device, and
selectively activate the valve based on the pressure within the air filter housing so as to selectively activate the dry material transfer pump.

17. A method for removing particulate matter from an air cleaner system comprising a precleaner, the method comprising:
fluidly coupling a dry material transfer pump to a port of a particulate matter collection chamber of the precleaner; the dry material transfer pump comprising:
an outer tube, comprising:
an outer tube channel having an upstream end that is axially aligned with a downstream end of the outer tube channel,
a plenum portion defined along a length of the outer tube channel and having a cross-sectional width that is larger than a cross-sectional width of the outer tube channel, and
a pressurized gas inlet defined through the outer tube and in fluid communication with the plenum portion,
an inner tube disposed annularly within the outer tube channel, the inner tube defining an inner tube channel having an inlet fluidly coupled to the port and configured to receive the particulate matter, at least one opening defined radially through a wall of the inner tube, the at least one opening fluidly coupling the plenum portion to the inner tube channel;
communicating pressurizing gas to the pressurized gas inlet of the dry material transfer pump, the pressurized gas being provided from a pressurized gas system included in a vehicle, and
wherein the pressurized gas creates suction in the dry material transfer pump causing particulate matter collected in the particulate matter collection chamber to be drawn into the dry material transfer pump and expelled into the environment through an outlet of the dry material transfer pump with the pressurized gas.

18. The method of claim 17, wherein the pressurized gas comprises pressurized air communicated from a turbocharger of a system including the air cleaner system.

19. The method of claim 17, wherein the pressurized gas comprises pressurized air provided by an air compressor of a system including the air cleaner system.

20. The method of claim 17, wherein the pressurized gas is selectively communicated to the pressurized gas inlet via a valve.

21. The method of claim 20, wherein the air cleaner further comprises an air filter, and wherein the method further comprises:
determining, by a pressure sensing device, a pressure within an air filter housing of the air filter; and
selectively activating, by a controller, the valve based on the pressure within the air filter housing so as to activate the dry material transfer pump.

* * * * *